(12) United States Patent
Van Mill et al.

(10) Patent No.: US 10,239,569 B2
(45) Date of Patent: *Mar. 26, 2019

(54) TRACK ASSEMBLY FOR FARM IMPLEMENT

(71) Applicant: Unverferth Manufacturing Company, Inc., Kalida, OH (US)

(72) Inventors: Michael D. Van Mill, Shell Rock, IA (US); Christopher M. Self, Aplington, IA (US); John Walvatne, Parkersburg, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/243,517

(22) Filed: Aug. 22, 2016

(65) Prior Publication Data

US 2016/0355221 A1    Dec. 8, 2016

Related U.S. Application Data

(63) Continuation of application No. 14/662,740, filed on Mar. 19, 2015, now Pat. No. 9,457,854.

(Continued)

(51) Int. Cl.
| | | |
|---|---|---|
| *B62D 55/30* | (2006.01) | |
| *B62D 55/06* | (2006.01) | |
| *B62D 55/104* | (2006.01) | |
| *B62D 55/084* | (2006.01) | |
| *B60P 3/22* | (2006.01) | |
| *B62D 55/108* | (2006.01) | |
| *B62D 55/112* | (2006.01) | |
| *B62D 55/14* | (2006.01) | |

(Continued)

(52) U.S. Cl.
CPC .............. *B62D 55/305* (2013.01); *B60P 3/22* (2013.01); *B62D 55/06* (2013.01); *B62D 55/084* (2013.01); *B62D 55/0842* (2013.01); *B62D 55/10* (2013.01); *B62D 55/104* (2013.01); *B62D 55/108* (2013.01); *B62D 55/112* (2013.01); *B62D 55/14* (2013.01); *B62D 55/15* (2013.01); *B62D 55/24* (2013.01); *B62D 55/30* (2013.01); *B60Y 2200/22* (2013.01)

(58) Field of Classification Search
CPC .... B62D 55/305; B62D 55/06; B62D 55/084; B62D 55/0842; B62D 55/10; B62D 55/104; B62D 55/108; B62D 55/112; B62D 55/14; B62D 55/15; B62D 55/24; B60P 3/22
USPC ................................................ 280/23.5, 28.5
See application file for complete search history.

(56) References Cited

U.S. PATENT DOCUMENTS

| | | |
|---|---|---|
| 1,518,465 A | 12/1924 | Sternberg |
| 4,166,511 A | 9/1979 | Stedman |

(Continued)

OTHER PUBLICATIONS

Exactrix Yielder 60120, 1 page.

(Continued)

*Primary Examiner* — Jacob D Knutson
(74) *Attorney, Agent, or Firm* — Rothwell, Figg, Ernst & Manbeck P.C.

(57) ABSTRACT

A mobile farm implement includes a track assembly with a plurality of arms that are pivotally coupled to support idler wheels and bogie wheels such that the track assembly is able to better conform to the terrain when the implement is towed behind a tractor or otherwise moved.

32 Claims, 16 Drawing Sheets

Related U.S. Application Data

(60) Provisional application No. 61/974,183, filed on Apr. 2, 2014.

(51) Int. Cl.
  *B62D 55/15* (2006.01)
  *B62D 55/10* (2006.01)
  *B62D 55/24* (2006.01)

(56) References Cited

U.S. PATENT DOCUMENTS

| | | | |
|---|---|---|---|
| 5,899,543 A | 5/1999 | Lykken et al. | |
| 6,298,933 B1* | 10/2001 | Simmons | B60G 7/001 180/9.46 |
| 6,712,549 B2* | 3/2004 | Roth | B62D 55/104 404/118 |
| 7,380,892 B2 | 6/2008 | Rosenboom | |
| 7,461,712 B2* | 12/2008 | Law | E21B 7/024 180/41 |
| 7,726,749 B2 | 6/2010 | Rosenboom | |
| 7,740,084 B2 | 6/2010 | Rosenboom | |
| 8,342,257 B2 | 1/2013 | Rosenboom | |
| 8,528,657 B1 | 9/2013 | Rosenboom | |
| 8,763,716 B2 | 7/2014 | Rosenboom | |
| 8,875,815 B2 | 11/2014 | Terrien | |
| 9,096,264 B2 | 8/2015 | Connors et al. | |
| 9,457,854 B2* | 10/2016 | Van Mill | B62D 55/305 |
| 2002/0023788 A1 | 2/2002 | Torrie | |
| 2007/0194540 A1 | 8/2007 | Caspi | |
| 2009/0001809 A1* | 1/2009 | Johnson | B62D 55/12 305/143 |
| 2009/0021073 A1* | 1/2009 | Bordini | B62D 55/096 305/124 |
| 2010/0231025 A1* | 9/2010 | Wagner | B60P 1/283 298/17 R |
| 2010/0263948 A1 | 10/2010 | Couture | |
| 2012/0062025 A1* | 3/2012 | Braun | B62D 55/305 305/151 |
| 2012/0073843 A1 | 3/2012 | Kure | |
| 2013/0181431 A1* | 7/2013 | McMahon | B60D 1/247 280/839 |
| 2014/0070604 A1* | 3/2014 | De Palma | B62D 55/305 305/145 |
| 2014/0262563 A1 | 9/2014 | Rosenboom | |

OTHER PUBLICATIONS

Balzer Grain Cart, brochure, 8 pages.
Balzer Inc. "Standard Model Specifications", Slurry Tank and more, 2 pages.
AG Spray Equipment brochure, 2 pages.

* cited by examiner

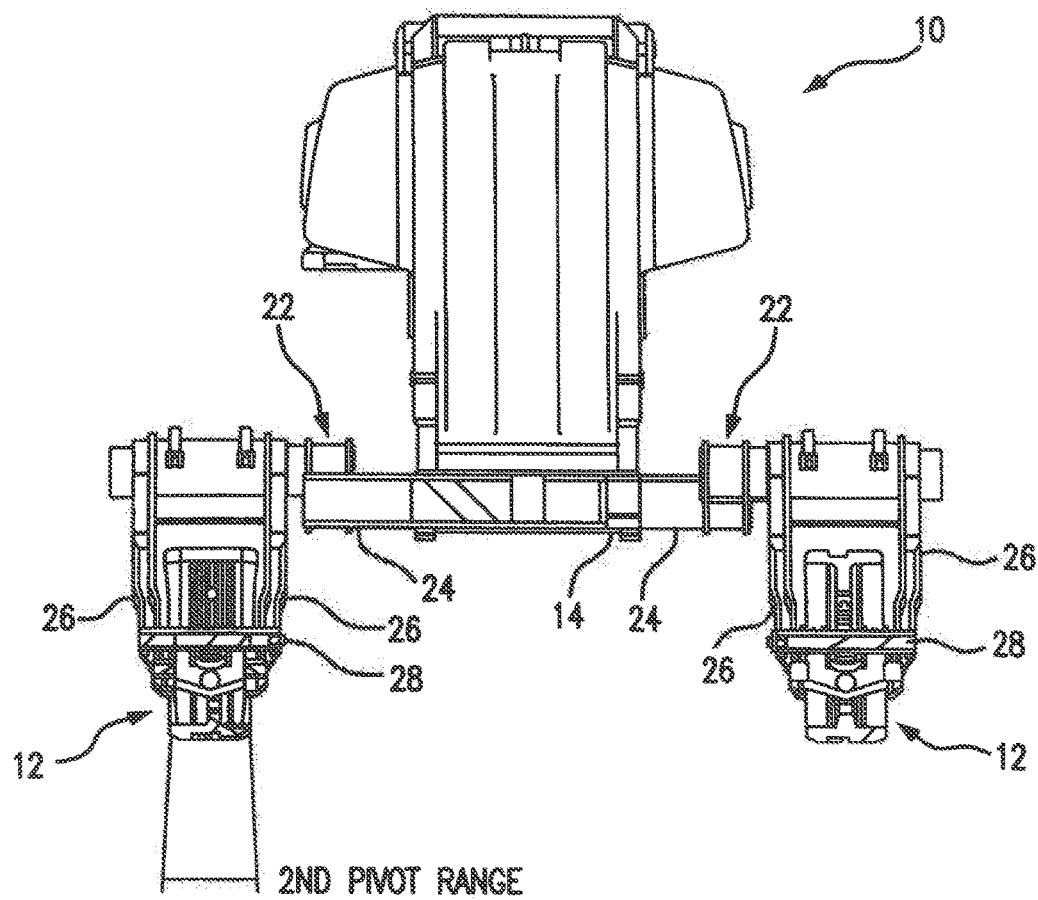
FIG. 3A
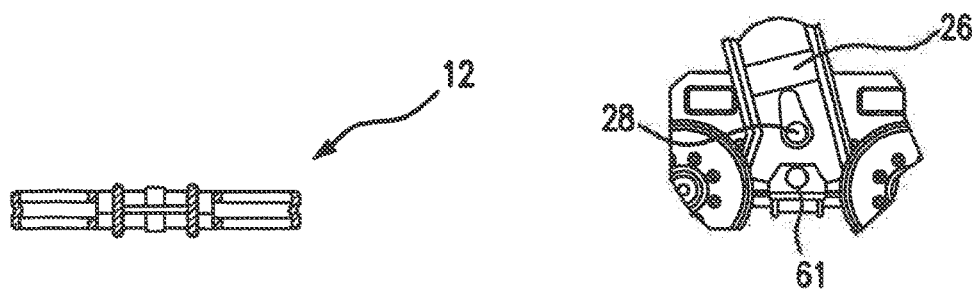
FIG. 3B
FIG. 3C

TRACK ASSEMBLY FOR FARM IMPLEMENT

CROSS-REFERENCE TO RELATED APPLICATION

This application is a Continuation of U.S. patent application Ser. No. 14/662,740 filed Mar. 19, 2015, and claims priority to Provisional Patent Application Ser. No. 61/974,183 filed on Apr. 2, 2014, the entire disclosures of which are incorporated herein by reference.

BACKGROUND OF THE INVENTION

Field of the Invention

The present invention is related generally to a track assembly for a mobile farm implement, and, more particularly, to a track system for a mobile farm implement including a plurality of arms and pivots to support idler wheels and bogie wheels such that the track assembly is able to better conform to the terrain when the farm implement is towed behind a tractor or otherwise moved.

Description of the Related Art

Mobile farm implements may generally include wheels or track assemblies to support the frame and allow a tow vehicle such as a tractor to move the farm implement. Mobile farm implements such as grain carts, seed tenders, and sprayers are used in fields in which the terrain may be uneven. If the track assemblies are not able to follow the contours of the terrain, it may cause stress on the track assemblies or the implement, which may cause failure or increased wear. In the case of towable farm implements, the farm implements are also required to closely follow the path of a tow vehicle to avoid moving off the path and damaging crops. Therefore, it is desirable to have track assemblies for a farm implement that can adapt to the unevenness of the terrain and closely follow the path of the tow vehicle.

SUMMARY OF THE INVENTION

According to an embodiment of the present invention, a farm implement includes a frame and a track assembly for assisting in moving the farm implement along a ground surface in a line of travel, the track assembly being pivotable about multiple axes so as to conform to changes in the ground surface level. The track assembly includes a camber arm coupled to the frame. The track assembly also includes a tilt arm that is coupled to the camber arm so as to be pivotable relative to the frame about a first axis perpendicular to the line of travel and pivotable relative to the camber arm about a second axis parallel to the line of travel. The track assembly further includes a rear idler wheel coupled to the tilt arm. The track assembly further includes a front idler wheel coupled to the tilt arm and positioned in front of the rear idler wheel along the line of travel. The track assembly further includes an alignment arm that is pivotally coupled to the front idler wheel so as to allow the front idler wheel to pivot about a third axis that is vertical relative to the tilt arm. The track assembly further includes a track belt looped around the front idler wheel and the rear idler wheel to make contact with the ground surface.

The farm implement track assembly may further include a first bogie arm coupled to the tilt arm and a first bogie wheel coupled to the bogie arm between the front idler wheel and the rear idler wheel, wherein the bogie arm is movable relative to the tilt arm and so as to allow the bogie wheel to move in a vertical direction relative to the tilt arm. The bogie wheel may be rotatably mounted to the bogie arm at a first location and the first bogie arm may be pivotally coupled to the tilt arm at a second location so as to allow the first bogie wheel to move in a vertical direction relative to the tilt arm (e.g., a direction up or down relative to a longitudinal axis of the tilt arm). The first bogie arm may further be pivotally coupled at a third location to the alignment arm such that when the first bogie wheel is moved in a vertical direction relative to the tilt arm, the alignment arm and front idler wheel are moved in an opposite vertical direction relative to the tilt arm, e.g. if the first bogie wheel is moved up relative to the tilt arm, the alignment arm and front idler wheel are moved down relative to the tilt arm and vice versa.

The farm implement may further include a second bogie arm coupled to the tilt arm and a second bogie wheel coupled to the second bogie arm between the first bogie wheel and the rear idler wheel along the line of travel, wherein the second bogie arm is movable relative to the tilt arm so as to allow the second bogie wheel to move in a vertical direction relative to the tilt arm. In another embodiment, the farm implement further includes a third bogie arm coupled to the tilt arm and a third bogie wheel coupled to the third bogie arm between the first bogie wheel and the second bogie wheel along the line of travel, wherein the third bogie arm is movable relative to the tilt arm so as to allow the third bogie wheel to move in a vertical direction relative to the tilt arm. In another embodiment, the farm implement further includes a fourth bogie arm coupled to the tilt arm and a fourth bogie wheel coupled to the fourth bogie arm between the first bogie wheel and the third bogie wheel along the line of travel, wherein the fourth bogie arm is movable relative to the tilt arm so as to allow the fourth bogie wheel to move in a vertical direction relative to the tilt arm.

The farm implement track assembly may further include a tensioner arm operatively coupled to the rear idler wheel for moving the rear idler wheel in a forward or rearward direction along the line of travel to increase or decrease the distance between the front idler wheel and the rear idler wheel. In another embodiment, the tensioner arm is operatively coupled to the front idler wheel for moving the front idler wheel in a forward or rearward direction along the line of travel to increase or decrease the distance between the front idler wheel and the rear idler wheel.

The farm implement track assembly may further include a first bogie arm coupled to the tilt arm and a first bogie wheel coupled to the bogie arm between the front idler wheel and the rear idler wheel along the line of travel. The bogie arm is movable relative to the tilt arm so as to allow the first bogie wheel to move in a vertical direction relative to the tilt arm. The first bogie wheel is rotatably mounted to the first bogie arm at a first location and the first bogie arm is pivotally coupled to the tilt arm at a second location, and pivotally coupled to the tensioner arm at a third location such that when the first bogie wheel is moved in a vertical direction relative to the tilt arm, the tensioner arm and rear idler wheel are moved in an opposite vertical direction relative to the tilt arm. The farm implement track assembly may also include a shock absorber pivotally coupled to the tensioner arm at a first end and pivotally coupled to the tilt arm at a second end. The shock absorber may be in the form of a spring or a hydraulic cylinder, and the hydraulic cylinder may include an accumulator.

The farm implement may further include a pivot stop coupled to the track assembly so as to limit the distance that the tilt arm can be pivoted about the first axis. The pivot stop may be mounted on the camber arm, wherein the tilt arm is coupled to the camber arm such that the tilt arm and the camber arm pivot together about the first axis.

In an embodiment of the present invention, the tilt arm may be an elongate member having a first end and a second end, and the camber arm may be a U-shaped member, with a pair of upright portions extending upwardly from a generally horizontal base portion and located between the first and second end of the tilt arm. In an embodiment, the second axis may extend through the base portion of the camber arm, and the first axis may extend through the pair of upright portions of the camber arm. In an embodiment, the second pivot axis may be under the first pivot axis. In an embodiment, the camber arm may be pivotable relative to the frame about the first axis. In another embodiment, the camber arm may sit within a notch formed in an upper part of the tilt arm. Further, the second pivot axis may be in the same plane as the first pivot axis.

The farm implement may further include a frame for supporting the track assembly, wherein the frame includes a slot and the pivot stop is received within the slot. The farm implement may also include a suspension assembly, wherein the frame is coupled to the track assembly via the suspension assembly. The suspension assembly may also include a telescoping arm that allows the lateral distance between the track assembly and the frame to be adjusted.

A farm implement may include two or more track assemblies according to the present invention for assisting in moving the farm implement along a ground surface in a line of travel. The track assemblies may be positioned on opposite lateral sides of the frame.

The farm implement may further include a hitch coupled to the frame so as to allow the farm implement to be towed behind a tractor or the like along a line of travel. In an embodiment, the farm implement may include a tank supported by the frame and configured to hold agricultural chemicals. A farm implement with such a tank may also include a boom support structure for mounting a boom or toolbar, e.g., to spray chemicals from the tank. In other embodiments, the farm implement may include a hopper supported by the frame and configured to receive and store granular agricultural material, such as grain or seed. If the farm implement includes such a hopper, the farm implement may also include a conveyor for unloading agricultural material from the hopper, filling the hopper or both.

BRIEF DESCRIPTION OF THE DRAWINGS

FIG. 3A illustrates a rear section view of a farm implement showing two track assemblies according to an embodiment of the present invention.

FIGS. 3, 3B, and 3C illustrate side views of a farm implement, including detailed sections of the track assembly, according to an embodiment of the present invention.

DETAILED DESCRIPTION OF THE PRESENT INVENTION

Figure 1:
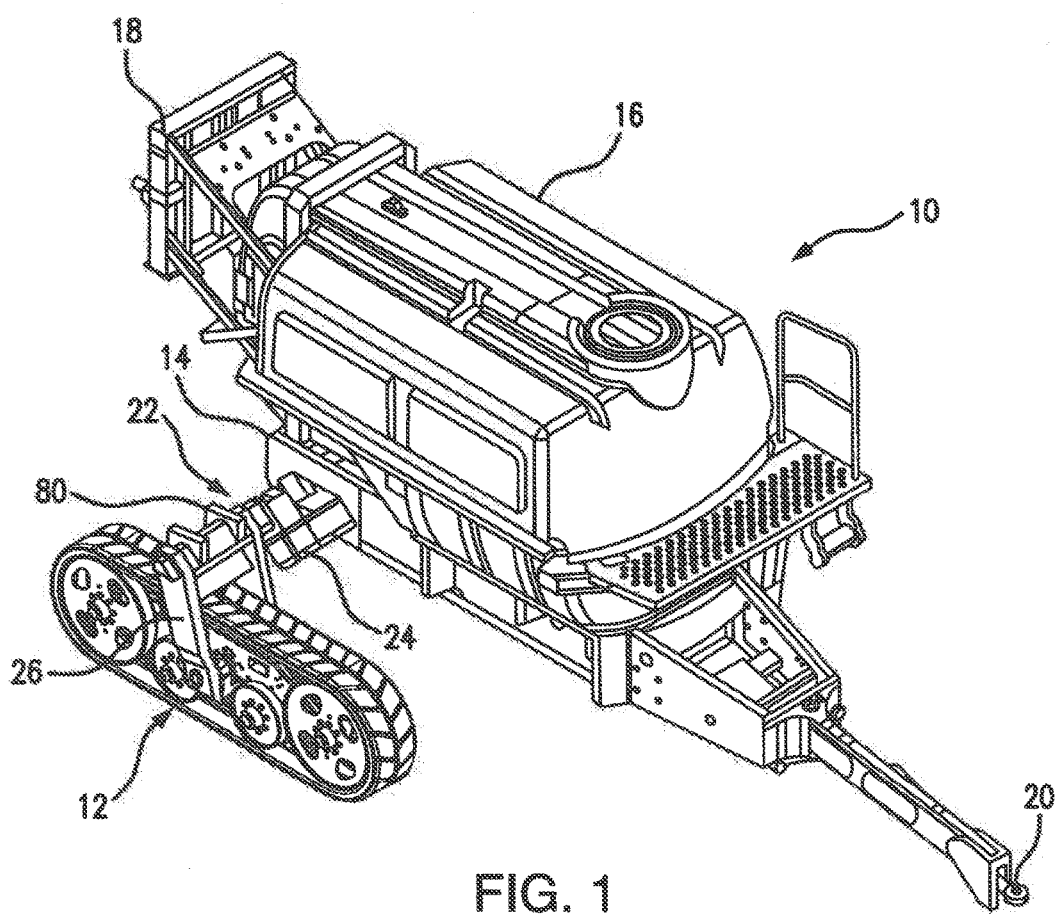
FIG. 1 illustrates an isometric view of a farm implement showing one track assembly according to an embodiment of the present invention.
Figure 2:
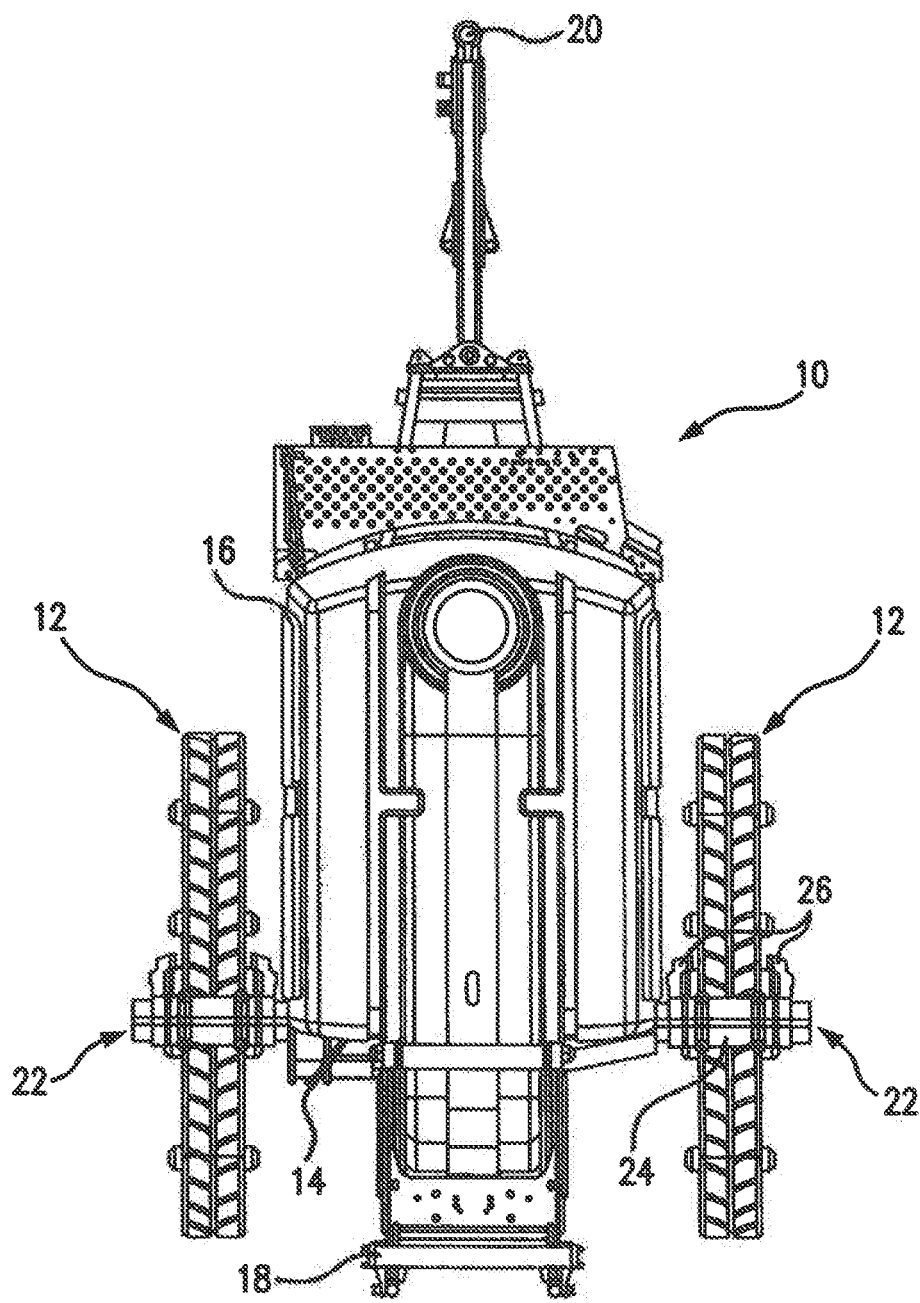
FIG. 2 illustrates a top view of a farm implement showing two track assemblies according to an embodiment of the present invention.

While the present invention may be embodied in many different forms, a number of illustrative embodiments are described herein with the understanding that the present disclosure is to be considered as providing examples and not intended to limit the invention to the preferred embodiments described and/or illustrated herein.

A farm implement 10 with track assemblies 12 according to an embodiment of the present invention is shown in FIGS. 1, 2, 3, 3A, 3B, and 3C. In the embodiment shown, the farm implement 10 is a crop sprayer with a frame 14, a tank 16 for holding chemicals mounted on the frame, and a boom support structure 18. Boom support structure 18 is coupled to a rear portion of the frame 14 and is configured to support a folding boom with nozzles for spraying chemicals from the tank 16. A tow hitch 20 extends forwardly from the frame 14 and allows the sprayer to be towed behind a tractor or the like. While the farm implement 10 is shown as a crop sprayer, it will be appreciated that the track assembly of the present invention can be used on other types of towable farm implements, such as grain carts and seed tenders, as well as self-powered farm implements, such as combines, and other types of vehicles intended to travel over soft ground.

In the embodiment shown, one track assembly 12 according to the present invention is disposed on a right side of the frame 14, and one track assembly 12 is disposed on a left side of the frame 14. In the embodiment shown, each track assembly 12 is coupled to the frame 14 by a suspension assembly 22. In the embodiment shown, each suspension assembly 22 includes a horizontal section 24 that extends laterally outward from the frame 14 and a pair of blades 26 that extend downwardly from an outer end of the horizontal section. In an embodiment, the outer end of the horizontal section 24 is disposed above the track assembly 12 and blades 26 extend downwardly on opposite sides of the track assembly. In an embodiment, the blades 26 extend forwardly at a slight angle from the horizontal section 24. Blades 26 mount a horizontal axle 28 that extends through the track assembly 12. Axle 28 is oriented perpendicular to the longitudinal axis of the farm implement (i.e., the direction of travel). In an embodiment, the length of the horizontal section 24 extending from the frame 14 may be adjusted, e.g., by mounting the horizontal section for sliding movement relative to the frame, so that the track width of the implement may be adjusted. For example, in the embodiment shown, a portion of the horizontal section is received telescopically within a tubular section of the frame and clamped in place when adjusted to a desired width. Similarly, in the embodiment shown, the position of the blades on the horizontal section is made adjustable by mounting the blades on a tubular member that slides telescopically over a portion of the horizontal section and providing clamps to hold the blades in a desired position. In the embodiment shown, clamps 80 include brackets disposed in notches formed in the outer telescoping member and bolts extending through the brackets into threaded openings allowing the brackets to be tightened against the inner telescoping member. Similar clamps can be used to hold the horizontal section 24 in a desired position relative to the frame. Suspension assemblies 22 can be rigid structures, or the suspension assemblies may include shock-absorbing members, such as springs, elastomeric bushings, air bags, etc.

FIGS. 4-9 show details of a track assembly 12 according to an embodiment of the present invention. Track assembly 12 includes a track belt 30 mounted on an undercarriage 32. In the embodiment shown, the undercarriage 32 includes first and second arms 34 and 36 mounted on axle 28, third and fourth arms 38 and 40 mounted at opposite ends of the first arm 34, respectively, and fifth and sixth arms 42 and 44 mounted on the third and fourth arms 38 and 40, respectively. A pair of laterally spaced front idler wheels 46 are mounted on front idler spindles 48 extending from opposite sides of the sixth arm 44, and a pair of laterally spaced rear idler wheels 50 are mounted on rear idler spindles 52 extending from opposite sides of the fifth arm 42. A pair of longitudinally spaced bogie wheels 54 and 56 are mounted on the third and fourth arms 38 and 40, respectively, between the front and rear idler wheels 46 and 50 on each side of the undercarriage. Track belt 30 is looped around the front and rear idler wheels 46 and 50.

Figure 3:
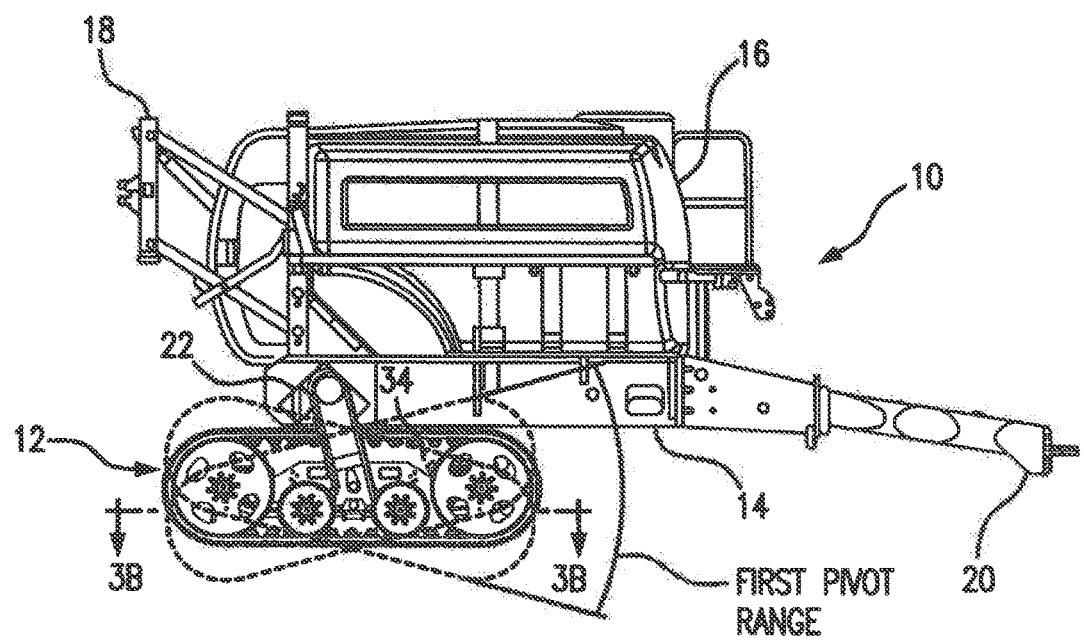
Figure 4:
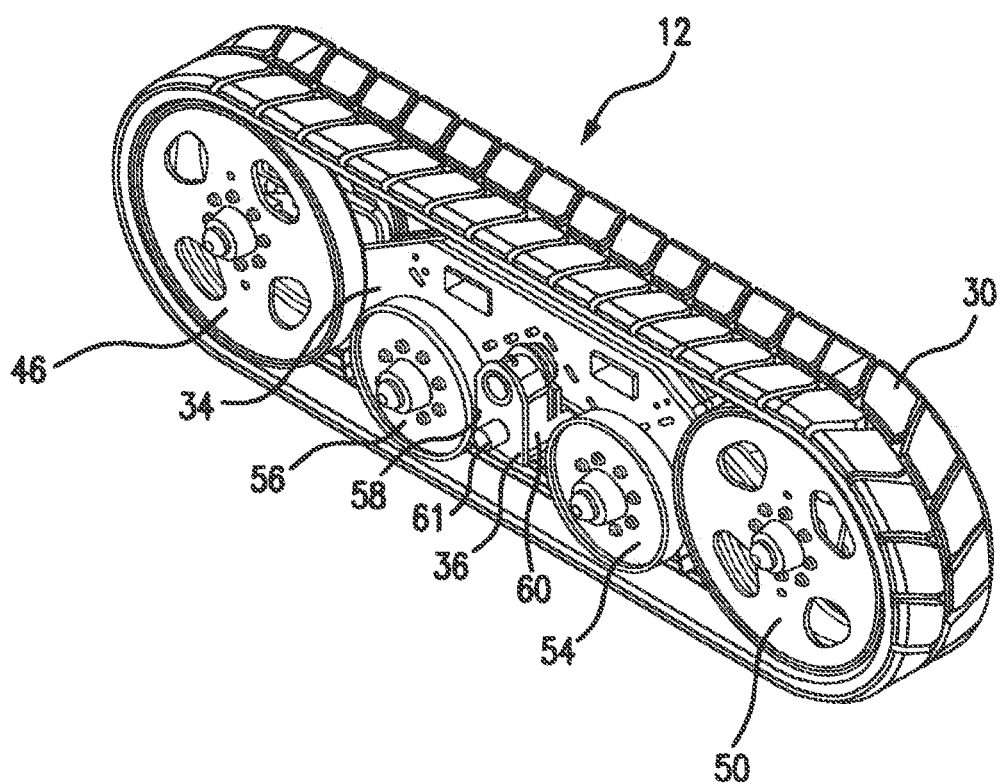
FIG. 4 illustrates an isometric view of the undercarriage of a track assembly according to an embodiment of the present invention.
Figure 5:
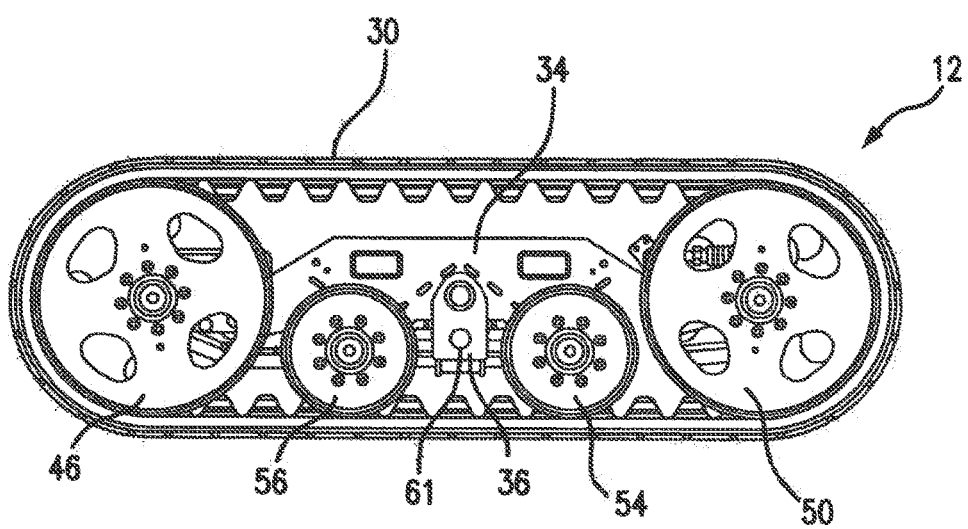
FIGS. 5 and 7 illustrate a side view of the undercarriage of a track assembly, with and without the belt, according to an embodiment of the present invention.
Figure 6:
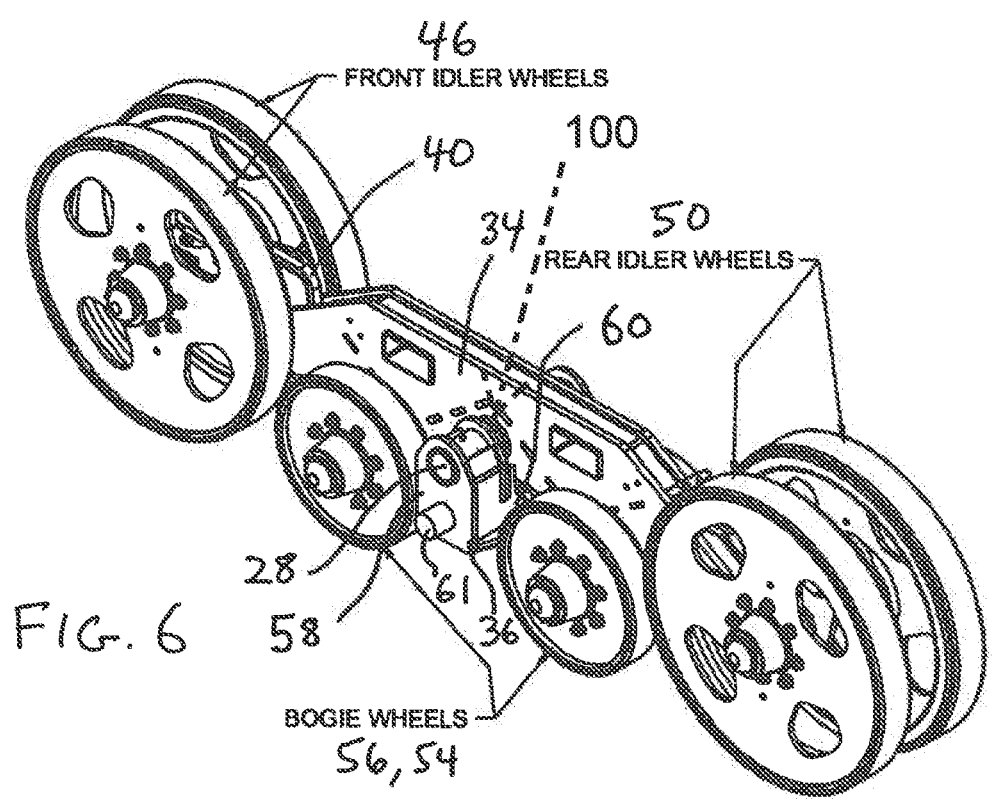
FIG. 6 illustrates an isometric view of the undercarriage of a track assembly, without the belt, according to an embodiment of the present invention.
Figure 7:
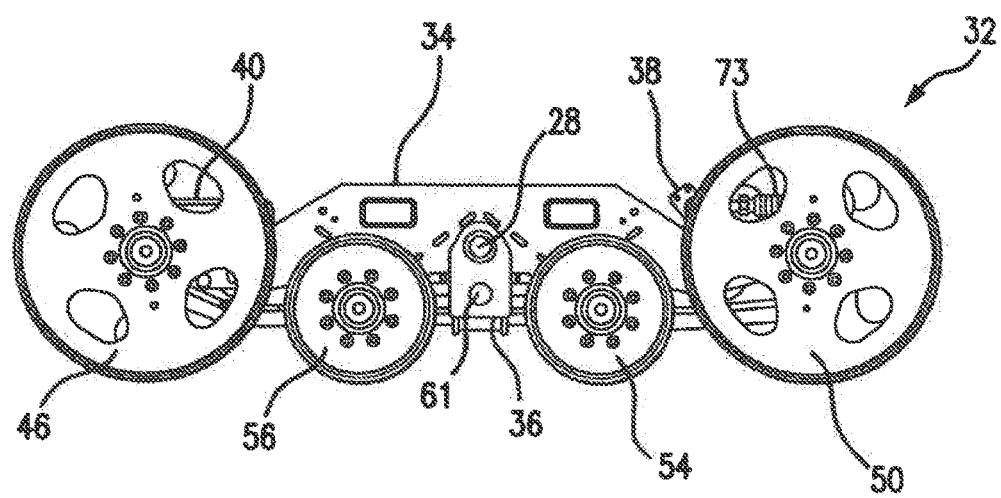

In the embodiment shown, the first arm 34 is an elongate member with front and rear ends, and the second arm 36 is generally U-shaped, with a pair of upright portions 58 extending upwardly from a generally horizontal base portion 60. A central portion of the first arm 34 is disposed between the upright portions 58 of the second arm 36 in the embodiment shown. Axle 28 extends through the upright portions 58 of the second arm 36 and the central portion of the first arm 34 and defines a first pivot axis perpendicular to the line of travel of the farm implement. Thus, the first arm 34 can independently pivot or oscillate about the first axis, e.g., as shown in FIGS. 3 and 4, allowing opposite ends of the first arm 34 to move up and down in order to conform to the road and field profiles thereby reducing stresses on components of the farm implement. The first arm may also be referred to herein as the tilt arm, and the second arm may also be referred to herein as the camber arm.

In the embodiment shown, front and rear ends of the first arm 34 may be vertically slotted to receive the fourth and third arms 38 and 40, respectively. Additionally, a lower edge of the first arm 34 may include one or more notches. For example, the first arm 34 may include a front notch to receive bogie spindle 70, a rear notch to receive bogie spindle 68, and a central notch between the front and rear notches to receive the base 60 of the second arm 36. Front and/or rear ends of the first arm 34 may also be tapered, as shown.

In an embodiment, a first pivot stop 61 may extend from the second arm 36 into a slot or opening in the suspension assembly 22 to limit the range of movement of the first arm 34 about the first pivot axis. In exemplary embodiments, the range of movement ($1^{st}$ pivot range) of the first arm 34 about the first pivot axis can be any angle greater than zero and up to 90 degrees (i.e., 45 degrees upward and 45 degrees downward). In a preferred embodiment, the first pivot range is 30 degrees (i.e., 15 degrees upward and 15 degrees downward).

The first arm 34 is also connected to the base 60 of the second arm 36 at a second pivot 62 below the first arm. The second pivot 62 defines a second pivot axis perpendicular to the first pivot axis, which allows the first arm 34 to pivot or oscillate as shown in FIG. 3A. Allowing the track to pivot about this second pivot axis provides variable camber. This variable camber allows the track to conform to arched road profiles and other unlevel field profiles which in turn reduces stresses on frame members, pins, bearings, etc. In exemplary embodiments, the range of movement (2nd pivot range) of the first arm 34 about the second pivot axis can be any angle greater than zero and up to 45 degrees (i.e., 22.5 degrees to the right or left of vertical). In a preferred embodiment, the $2^{nd}$ pivot range is 7 degrees (i.e., 3.5 degrees to the right or left of vertical). In another embodiment (e.g. as shown in FIGS. 10-15), the 2nd pivot range is 16 degrees (i.e. 8 degrees to the left or right of vertical). In the embodiment shown, pivot 62 also couples the first and second arms to pivot or tilt together about the first axis.

Figure 8:
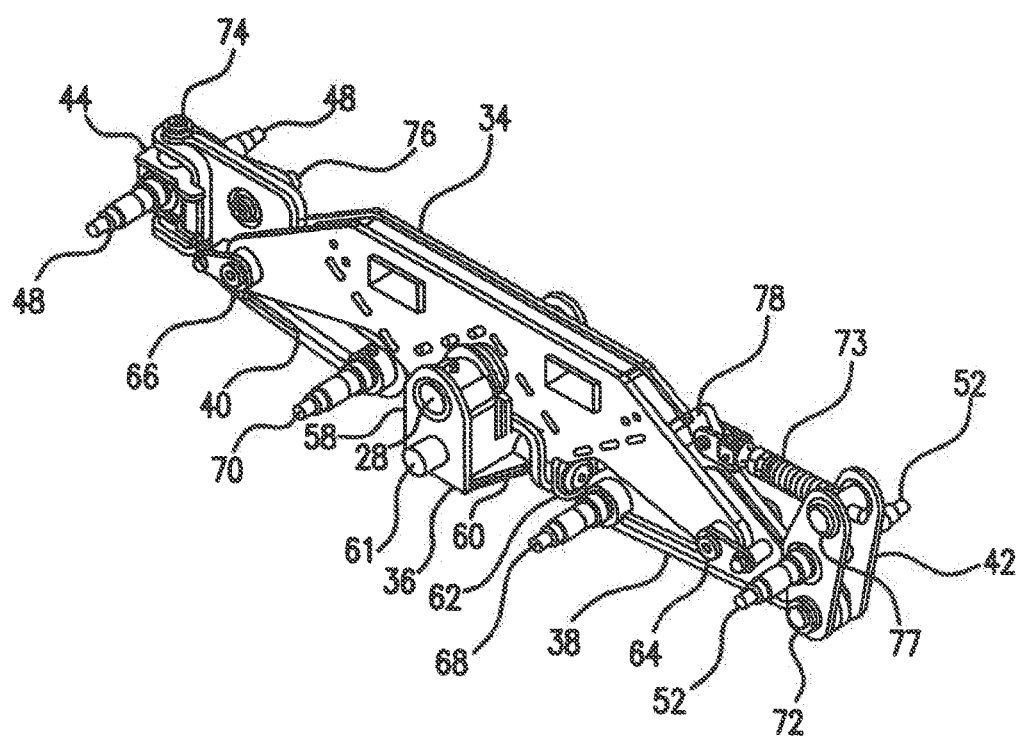
FIG. 8 illustrates an isometric view of the undercarriage of a track assembly, without the belt and wheels, according to an embodiment of the present invention.
Figure 9:
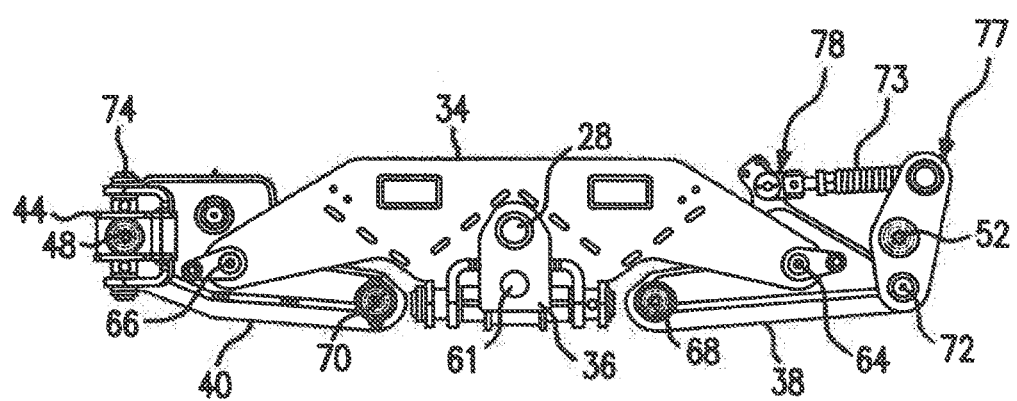
FIG. 9 illustrates a side view of the undercarriage of a track assembly, without the belt and wheels, according to an embodiment of the present invention.
Figure 10:
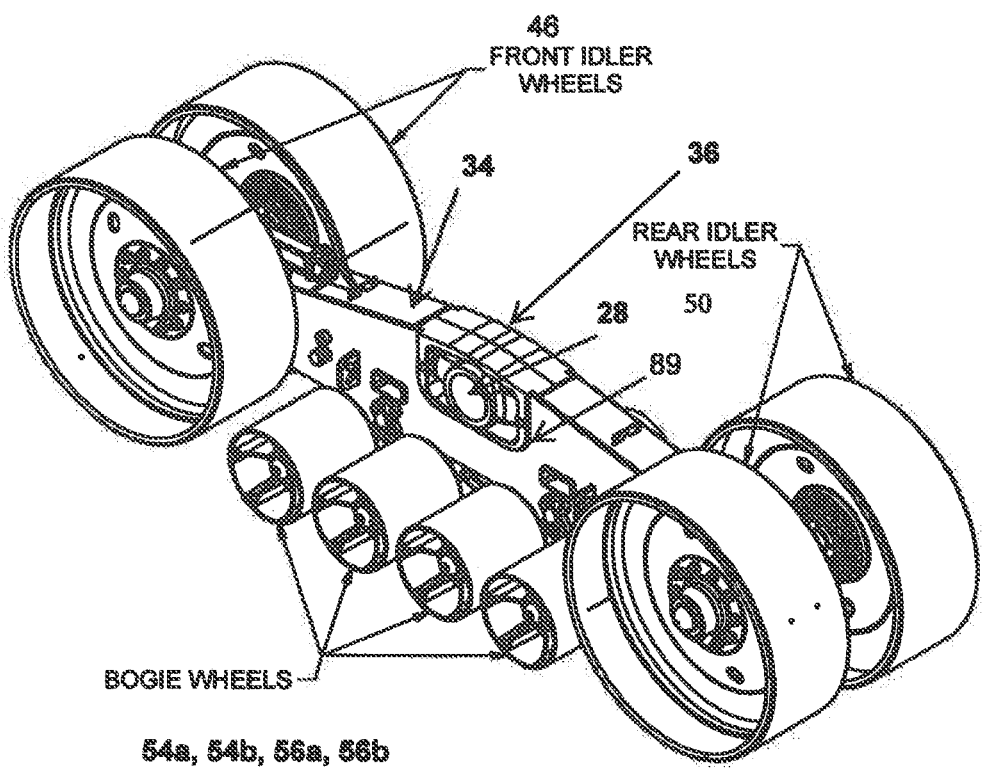
FIG. 10 illustrates an isometric view of the undercarriage, without the belt, of a track assembly according to an embodiment of the present invention.

As noted above, attached to the first arm 34 are a third [rear] arm 38 and fourth [front] arm 40. The third and fourth arms 38 and 40 attached to opposite ends of the first arm 34 at third and fourth pivots 64 and 66, respectively, that define third and fourth pivot axes oriented perpendicular to the second pivot axis, allowing the third and fourth arms 38 and 40 to pivot independently of the first arm and each other. The third and fourth arms 38 and 40 each contain a set of bogie wheel spindles 68 and 70, respectively. As noted above, spindles 68 and 70 may be positioned in notches formed in a lower edge of the first arm 34. The third arm may also be referred to herein as the first bogie arm, and the fourth arm may also be referred to herein as the second bogie arm. The third and fourth pivots 64 and 66 are at locations between the idler and bogie spindles. The third arm 38 also includes a fifth pivot 72 defining a fifth pivot axis parallel to the third and fourth pivot axes, for a fifth [tensioner] arm 42 used to tension the track belt 30. This fifth arm 42 can pivot about the fifth pivot axis to move the idler wheel spindle 52 in a generally forward and aft direction to decrease or increase distance between front and rear idler wheels 46 and 50 thus decreasing or increasing the force (i.e., tension) on the track belt 30. The fifth arm may also be referred to herein as the tensioner arm. Movement of the fifth arm 42 may be provided by a spring (e.g., as shown in FIG. 8 at 73, connected between an $8^{th}$ pivot 78 on the third arm and a $7^{th}$ pivot 77 on the fifth arm), a hydraulic cylinder and accumulator, an airbag, or other device known in the art to apply and absorb spike forces. Alternatively, the fifth arm 42 may be moved by means of an adjustable link, such as a turnbuckle, which can tension the track belt but would provide little or no compliance. In exemplary embodiments, the range of motion of the fifth arm 42 in the generally forward and aft directions, measured at the spindle 52, can be up to 10 inches. In a preferred embodiment, the range of motion of the fifth arm is about 2 inches. In the embodiment shown, the fifth arm 42 extends rearwardly from a notch in the lower edge of the first arm 34 to pivot 72 spaced longitudinally rearwardly from the rear end of the first arm and upwardly through a vertical slot in the rear end of the first arm to couple with tensioner element 73. In another embodiment (e.g., as shown in FIGS. 10-14), the tensioner arm may be in the front end of the assembly with the alignment arm.

In the embodiment shown, the fourth [front] arm 40 includes a sixth pivot 74 defining a sixth pivot axis about which the sixth arm 44 may pivot, which in turn controls the angle of the front idler spindles 48 relative to the line of travel. The sixth arm may also be referred to herein as the alignment arm. The sixth pivot axis is perpendicular to the fourth pivot axes (i.e., generally vertical). This sixth arm movement may be adjusted so the track belt 30 can run until the track belt lugs have minimum contact with the inside of the idler wheels 46 and 50. An adjustment bolt or set screw 76 or the like may be used to adjust the position of the sixth arm 44 so that the sixth arm remains in the desired position as the implement is towed. In exemplary embodiments, the amount of angular adjustment of the sixth arm about the sixth pivot axis can be up to 10 degrees (i.e., 5 degrees clockwise or counterclockwise). In a preferred embodiment, the amount of angular adjustment of the sixth arm about the sixth pivot axis is about 4 degrees (i.e., 2 degrees clockwise or 2 degrees counterclockwise). In the embodiment shown, the fourth arm 40 extends forwardly from a front notch in the lower edge of the first arm 34 to sixth arm 44 spaced forwardly of the front end of the first arm and upwardly through a vertical slot in the front end of the first arm.

In the embodiment shown, the front and rear idler spindles 48 and 52 are longitudinally spaced forwardly and rearwardly of the front and rear ends of the first arm 34, respectively. The rear idler wheels 50 are movable generally upwardly and downwardly relative to the first arm 34 by pivoting about one or more axes (e.g., 64 and 72) perpendicular to the direction of travel, and front idler wheels 46 are movable generally upwardly and downwardly, and side to side, relative to the first arm by pivoting about axes 66 and 74.

Figure 11:
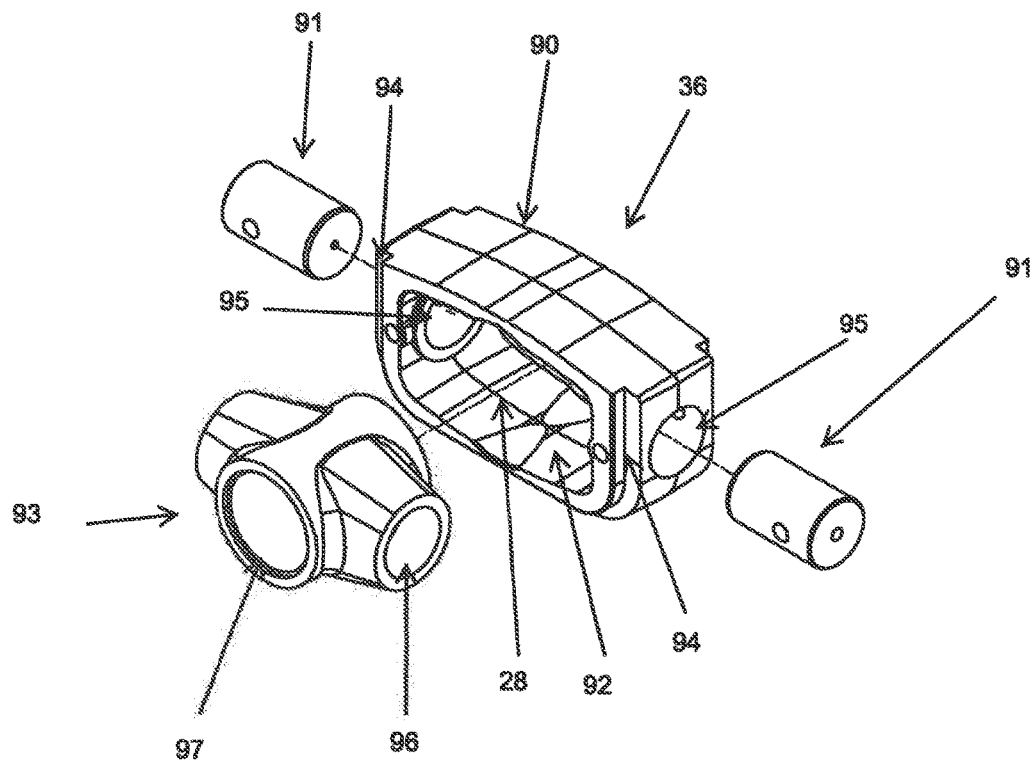
FIG. 11 illustrates an exploded isometric view of a camber pivot for use in a track assembly according to an embodiment of the present invention.
Figure 12:
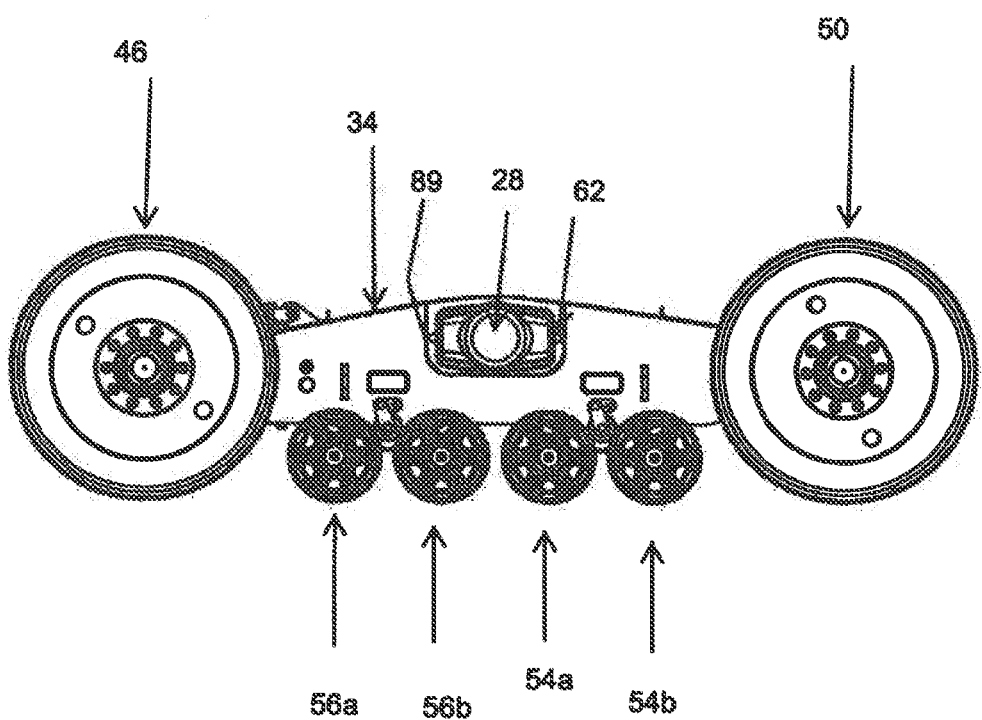
FIG. 12 illustrates a side view of an undercarriage, without the belt, of a track assembly according to an embodiment of the present invention.
Figure 13:
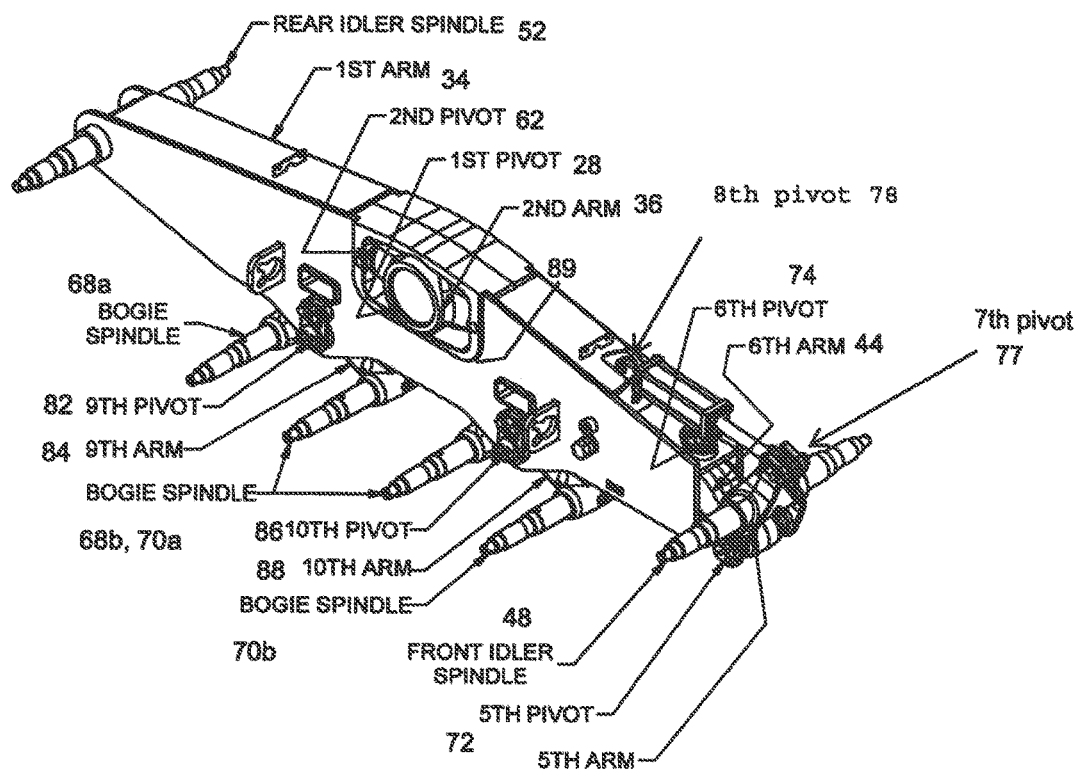
FIG. 13 illustrates an isometric view of an undercarriage, without the belt and wheels, of a track assembly according to an embodiment of the present invention.
Figure 14:
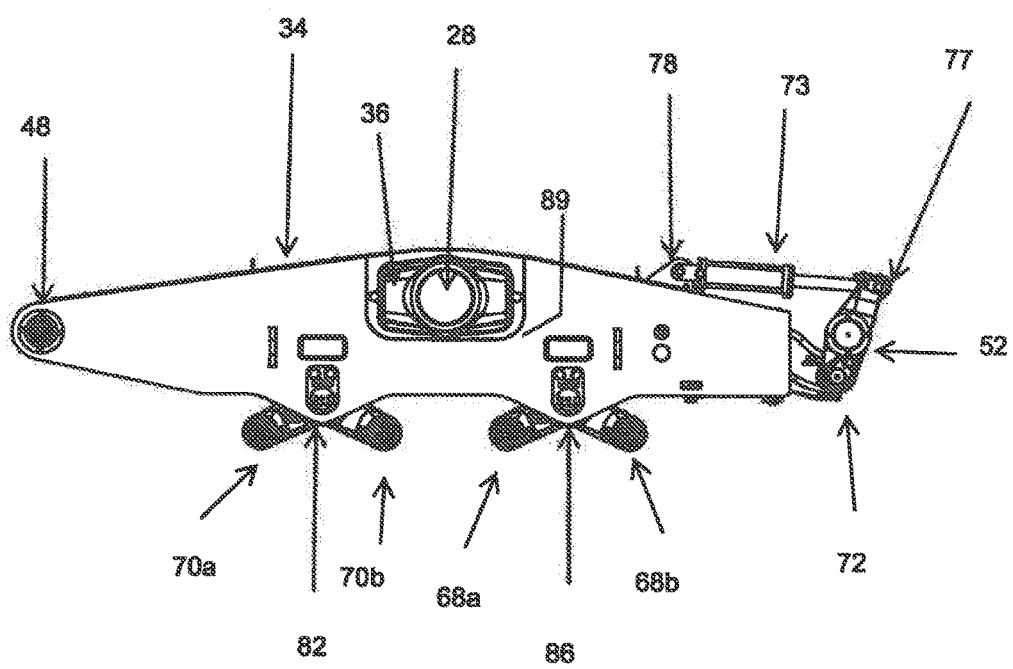
FIG. 14 illustrates a side view of an undercarriage, without the belt and wheels, of a track assembly according to an embodiment of the present invention.

In another embodiment of a track assembly according to the present invention, shown in FIGS. 10-14, the camber arm 36 may be positioned within an opening 89 in the tilt arm 34. In some embodiments, the opening 89 may comprise a notch formed at a central location along an upper edge of the tilt arm 34. Opening 89 is configured to receive camber arm 36, e.g., the opening may be generally rectangular with vertical front and rear edges, a horizontal bottom edge, and an open top as shown, and the camber arm 36 may have a generally rectangular configuration to fit within the opening. As best seen in FIG. 11, camber arm 36 may include a housing 90 defining a cavity 92 open on laterally opposed sides, and a gimbal 93 may be pivotally mounted within the cavity 92 to pivot about a longitudinal axis of the housing. In an embodiment, vertical grooves (not shown) are formed in front and rear edges of the opening 89, and vertical ridges 94 are formed on front and rear sides of the housing 90 and configured to fit within the vertical grooves in the opening to secure the housing in the opening such that the housing and the tilt arm move together as a unit. Gimbal 93 has a body defining a longitudinal bore 96 and a lateral bore 97 that intersect one another. In an embodiment, the gimbal 93 may have a cruciform shape comprised of hollow tubular portions arranged perpendicular to one another.

Lateral bore 97 in the gimbal 93 may receive a shaft extending laterally from the frame of the implement and defining a lateral pivot axis about which the gimbal 93 may pivot. A pair of openings 95 may extend longitudinally through the ridges 94 of the housing 90 in coaxial alignment with one another; and, when the gimbal 93 is positioned within the housing 90, the openings 95 may also be coaxially aligned with the longitudinal bore 96 of the gimbal 93. Pivot pins 91 extend through the openings 95 in the housing 90 and into the longitudinal bore 96 of the gimbal 93, thus pinning opposite longitudinal ends of the gimbal to the housing so that the gimbal, the housing, and the tilt arm 34 all pivot together about the lateral pivot axis. The pivot pins 91 also define a longitudinal pivot axis about which the housing 90 and the tilt arm 34 may pivot relative to the gimbal 93. In the embodiment shown, the lateral and longitudinal pivot axes intersect and are coplanar.

In the embodiment shown in FIGS. 10-14, the tensioner (fifth arm 42) and the alignment (sixth arm 44) may both be located at the front end of the track assembly 12. Also, instead of first and second bogie arms coupled with front and rear idler wheels, this embodiment includes third and fourth bogie arms 84 and 88 each supporting two sets of bogie wheels 54a, 54b and 56a, 56b. These bogie wheels may be supported by bogie spindles 68a, 68b and 70a, 70b. The third bogie arm 84 (also called the ninth arm) includes a ninth pivot 82 defining a ninth pivot axis about which the ninth arm 84 may pivot, which in turn controls the relative position of the bogie wheels to each other. The fourth bogie arm 88 (also called the tenth arm) includes a tenth pivot 86 defining a tenth pivot axis about which the tenth arm 88 may pivot, which in turn controls the relative position of the bogie wheels to each other. The third and fourth bogie arms 84 and 88 may each have an inverted V-shaped configuration, pivotally coupling with the first arm 34 at respective top ends and supporting bogie spindles 68a, 68b, 70a, 70b at respective bottom ends, such that when one set of bogie wheels moves vertically in an upward or downward direction, the other set of bogie wheels mounted on the same bogie arm moves in the opposite direction.

Figure 15:
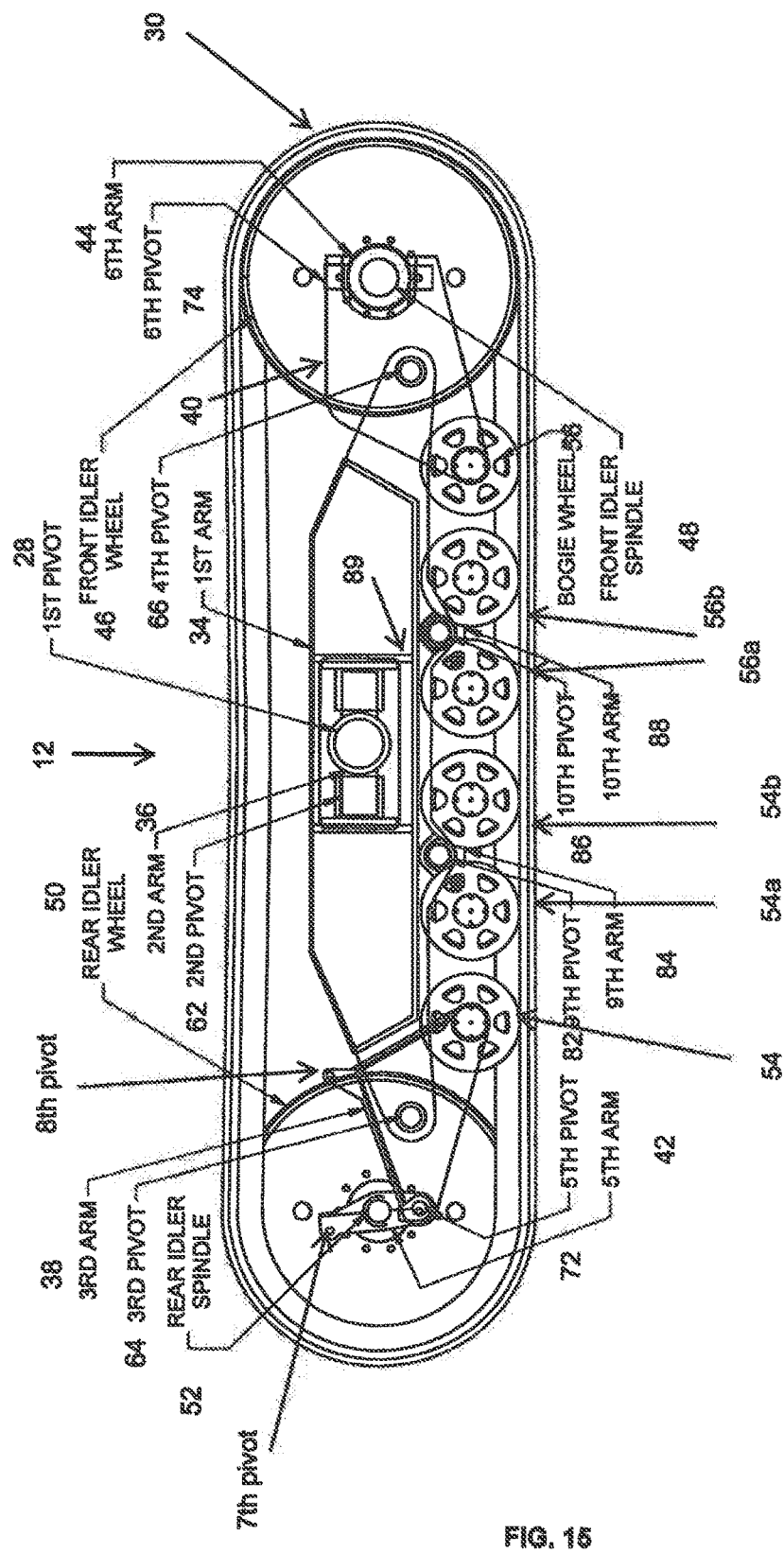
FIG. 15 illustrates a side view of track assembly according to an embodiment of the present invention.

In another embodiment (e.g. as shown in FIG. 15), additional sets of bogie wheels may be added. For example, in addition to bogie wheels 54a, 54b and 56a, 56b coupled to the third and fourth bogie arms 84 and 88, there may be bogie wheels 54 and 56 coupled to first and second bogie arms 38 and 40. It should be noted that the embodiment shown in FIG. 15 can be modified by removing the four sets of extra bogie wheels (i.e. the third and fourth bogie arms), making it shorter and resembling the embodiment of FIG. 8, for example, but for the camber arm sitting within an opening along an upper edge of the first arm instead of being located below the first arm.

In another embodiment, an elastic member 100 (for example, rubber) is connected between the camber arm and the tilt arm to allow for camber rotation and suspension. The elastic member 100 may be fitted on the opening in the tilt arm.

While an exemplary embodiment of the present invention has been shown and described, it will be appreciated that various modifications and improvements can be made without departing from the scope and spirit of the invention. For example, while a farm implement with one track assembly on each side is shown, it will be appreciated that two or more track assemblies can be provided on each side of the farm implement. Furthermore, while a suspension assembly with a horizontal section and two vertical blades is shown, it will be appreciated that a one-bladed suspension system can be used, or the track assemblies can be mounted directly on the frame. Additionally, while forwardly angled blades are shown, it will be appreciated that generally vertical or rearwardly angled blades can be used. In addition, while a single axle is shown extending through each track assembly, it will be appreciated that the track suspension can be configured to support the track using one or more axles that extend only part way through the track assembly. Moreover, while a spring is shown applying a force on the fifth arm of the undercarriage to tension the track belt, it will be appreciated that other tensioning devices can be used, e.g., other shock-absorbing tensioners such as hydraulic cylinders and accumulators, and airbags, as well as non-shock-absorbing tensioners such as turn-buckle type links of adjustable length. Further, while a stop is shown extending from the second arm into an opening or slot in the suspension assembly, it will be appreciated that a stop may extend from the suspension assembly into an opening or slot formed in the second arm to limit the range of motion of the first arm about the first pivot axis. Also, while the second arm is shown as a U-shaped member that cradles the first arm from the bottom and defines a second pivot axis under the first pivot axis, it will be appreciated that the second arm can have other configurations. For example, the second arm can be an inverted U-shaped member that cradles the first arm from the top and defines a second pivot axis over the first pivot axis, or the second arm can be a member that sits within an opening formed in an upper or lower portion of the first arm that defines a second pivot axis in the same plane as the first pivot axis. It will be appreciated that although the opening is depicted in the form of a notch along an upper edge of the tilt arm, other forms of the opening are possible, such as an opening in the middle (vertically) of the tilt arm. These and other modifications and variations are intended to be within the scope of the present invention.

We claim:

1. A farm implement comprising:
a frame;
a track assembly for assisting in moving the farm implement along a ground surface in a line of travel, wherein the track assembly includes:
a camber arm coupled to the frame;
a tilt arm coupled to the camber arm so as to be pivotable relative to the frame about a first axis parallel to the ground surface and perpendicular to the line of travel and pivotable relative to the camber arm about a second axis parallel to the line of travel;
a rear idler wheel coupled to the tilt arm;
a front idler wheel coupled to the tilt arm and positioned in front of the rear idler wheel along the line of travel; and
a track belt looped around the front idler wheel and the rear idler wheel to make contact with the ground surface.

2. The farm implement of claim 1, further comprising:
a first bogie arm coupled to the tilt arm; and
a first bogie wheel coupled to the first bogie arm between the front idler wheel and the rear idler wheel.

3. The farm implement of claim 2, wherein the first bogie arm is movable relative to the tilt arm so as to allow the first bogie wheel to move in a vertical direction relative to the tilt arm.

4. The farm implement of claim 3, wherein the first bogie wheel is rotatably mounted to the first bogie arm at a first location and the first bogie arm is pivotally coupled to the tilt arm at a second location so as to allow the first bogie wheel to move in the vertical direction relative to the tilt arm.

5. The farm implement of claim 2, further comprising:
a second bogie arm coupled to the tilt arm; and
a second bogie wheel coupled to the second bogie arm between the first bogie wheel and the rear idler wheel along the line of travel.

6. The farm implement of claim 5, wherein the second bogie arm is movable relative to the tilt arm so as to allow the second bogie wheel to move in a vertical direction relative to the tilt arm.

7. The farm implement of claim 5, further comprising:
a third bogie arm coupled to the tilt arm; and
a third bogie wheel coupled to the third bogie arm between the first bogie wheel and the second bogie wheel along the line of travel.

8. The farm implement of claim 7, wherein the third bogie arm is movable relative to the tilt arm so as to allow the third bogie wheel to move in a vertical direction relative to the tilt arm.

9. The farm implement of claim 7, further comprising:
a fourth bogie arm coupled to the tilt arm; and
a fourth bogie wheel coupled to the fourth bogie arm between the first bogie wheel and the third bogie wheel along the line of travel.

10. The farm implement of claim 9, wherein the fourth bogie arm is movable relative to the tilt arm so as to allow the fourth bogie wheel to move in a vertical direction relative to the tilt arm.

11. The farm implement of claim 1, further comprising:
a tensioner arm operatively coupled to one of said idler wheels for moving the coupled idler wheel in a forward or rearward direction along the line of travel to increase or decrease a distance between the front idler wheel and the rear idler wheel.

12. The farm implement of claim 11, further comprising:
a first bogie arm coupled to the tilt arm;
a first bogie wheel coupled to the first bogie arm between the front idler wheel and the rear idler wheel along the line of travel,
wherein the first bogie arm is movable relative to the tilt arm so as to allow the first bogie wheel to move in a vertical direction relative to the tilt arm, and
wherein the first bogie wheel is rotatably mounted to the first bogie arm at a first location and the first bogie arm is pivotally coupled to the tilt arm at a second location, and pivotally coupled to the tensioner arm at a third location such that when the first bogie wheel is moved in a vertical direction relative to the tilt arm, the tensioner arm and the idler wheel coupled to the tensioner arm are moved in an opposite vertical direction relative to the tilt arm.

13. The farm implement of claim 11, further comprising:
a shock absorber pivotally coupled to the tensioner arm at a first end and pivotally coupled to the tilt arm at a second end.

14. The farm implement of claim 13, wherein the shock absorber is in the form of a spring.

15. The farm implement of claim 13, wherein the shock absorber includes a hydraulic cylinder.

16. The farm implement of claim 1, further comprising:
a pivot stop coupled to the track assembly so as to limit a distance that the tilt arm can be pivoted about the first axis.

17. The farm implement of claim 16, wherein the tilt arm is coupled to the camber arm such that the tilt arm and the camber arm pivot together about the first axis, and wherein the pivot stop is mounted on the camber arm.

18. The farm implement of claim 17, wherein the frame includes a slot and the pivot stop is received within the slot.

19. The farm implement of claim 18, further comprising: a suspension assembly, wherein the frame is coupled to the track assembly via the suspension assembly.

20. The farm implement of claim 19, wherein the suspension assembly includes a telescoping arm that allows a lateral distance between the track assembly and the frame to be adjusted.

21. The farm implement of claim 1, further comprising:
a second track assembly for assisting in moving the farm implement along a ground surface in a line of travel, the second track assembly including:
a second camber arm coupled to the frame;
a second elongate tilt arm coupled to the second camber arm so as to be pivotable relative to the frame about a first axis parallel to the ground surface and perpendicular to the line of travel and pivotable relative to the camber arm about a second axis parallel to the line of travel;
a second rear idler wheel coupled to the second tilt arm;
a second front idler wheel coupled to the second tilt arm and positioned in front of the second rear idler wheel along the line of travel;
a second alignment arm pivotally coupled to one of said second idler wheels so as to allow the second pivotally-coupled idler wheel to pivot about a third axis that is vertical relative to the second tilt arm; and
a second track belt looped around the second front idler wheel and the second rear idler wheel to make contact with the ground surface;
wherein the first track assembly and the second track assembly are positioned on opposite lateral sides of the frame and independently pivotable relative to the frame.

22. The farm implement of claim 1, further comprising:
a hitch coupled to the frame so as to allow the farm implement to be towed in the line of travel; and a tank supported by the frame and configured to hold agricultural chemicals.

23. The farm implement of claim 1, further comprising:
a hitch coupled to the frame so as to allow the farm implement to be towed in the line of travel; and a hopper supported by the frame and configured to receive and store granular agricultural material.

24. The farm implement of claim 1, wherein the tilt arm is elongate, having a first end and a second end.

25. The farm implement of claim 24, wherein the camber arm is U-shaped, with a pair of upright portions extending upwardly from a generally horizontal base portion and located between the first end and the second end of the tilt arm.

26. The farm implement of claim 25, wherein the second axis extends through the base portion of the camber arm.

27. The farm implement of claim 26, wherein the first axis extends through the pair of upright portions of the camber arm.

28. The farm implement of claim 27, wherein the second pivot axis is under the first pivot axis.

29. The farm implement of claim 24, wherein the camber arm is pivotable relative to the frame about the first axis.

30. The farm implement of claim 24, wherein the camber arm sits within an opening formed in the tilt arm, wherein the second pivot axis is in the same plane as the first pivot axis.

31. The farm implement of claim 1, further comprising an elastic member connected between the camber arm and the tilt arm.

32. A farm implement comprising:
a frame;
a camber arm coupled to the frame;
a track assembly for assisting in moving the farm implement along a ground surface in a line of travel, wherein said track assembly includes:
a tilt arm coupled to said camber arm so as to be pivotable relative to the camber arm about a first axis parallel to the ground surface and perpendicular to the line of travel and pivotable relative to the camber arm about a second axis parallel to the line of travel.

\* \* \* \* \*